No. 673,678. Patented May 7, 1901.
J. C. CHAMBERLAIN & H. R. SUTPHEN.
STORAGE BATTERY.
(Application filed Sept. 11, 1899.)
(No Model.) 2 Sheets—Sheet 1.
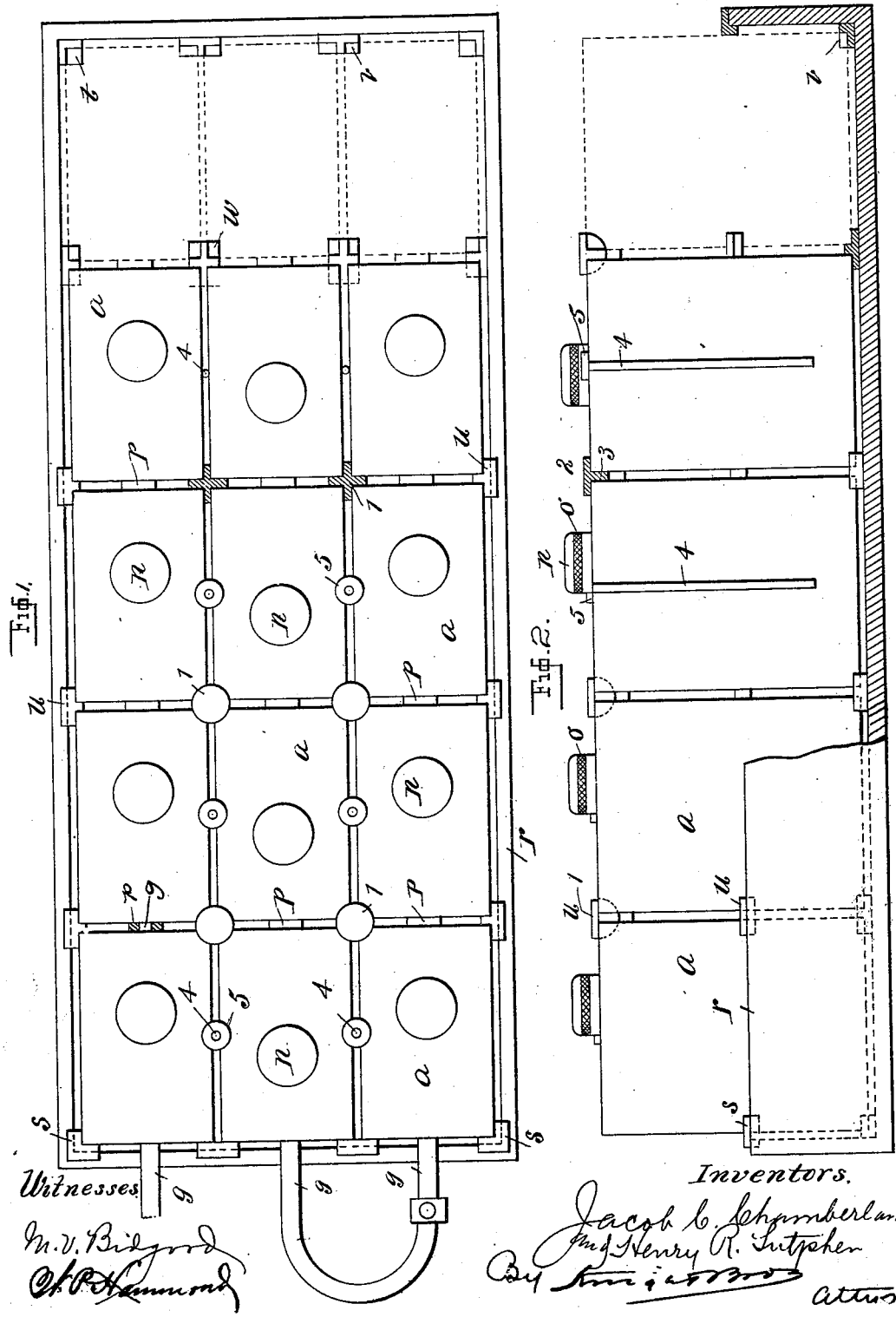

No. 673,678. Patented May 7, 1901.
J. C. CHAMBERLAIN & H. R. SUTPHEN.
STORAGE BATTERY.
(Application filed Sept. 11, 1899.)
(No Model.) 2 Sheets—Sheet 2.
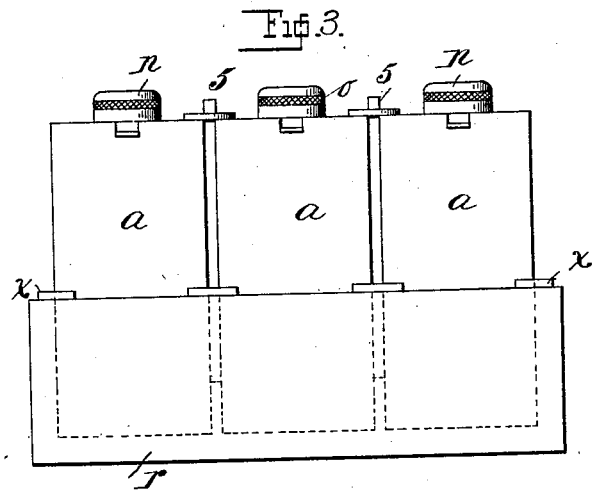
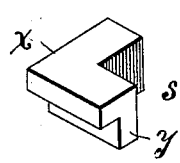
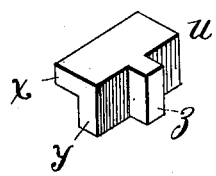
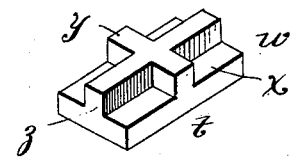
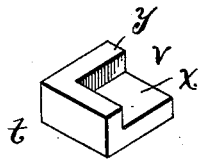
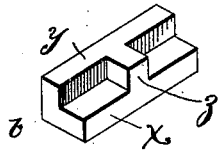
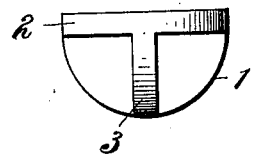
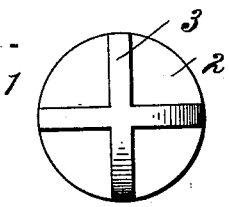
Witnesses.
M. V. Bidgood
H. P. Hammond
Inventors.
Jacob C. Chamberlain
Henry R. Sutphen
By _____ Attys

UNITED STATES PATENT OFFICE.

JACOB C. CHAMBERLAIN, OF NEW YORK, AND HENRY R. SUTPHEN, OF HIGHBRIDGE, NEW YORK.

STORAGE BATTERY.

SPECIFICATION forming part of Letters Patent No. 673,678, dated May 7, 1901.

Application filed September 11, 1899. Serial No. 730,076. (No model.)

*To all whom it may concern:*

Be it known that we, JACOB CHESTER CHAMBERLAIN, residing in New York, and HENRY R. SUTPHEN, residing in Highbridge, in the county and State of New York, citizens of the United States, have invented certain new and useful Improvements in Storage Batteries, of which the following is a specification.

This invention relates to improvements in storage batteries, and has especial reference to the mechanical connection and support of the cells, whereby the efficiency of the connections and also of the insulation between the cells is maintained.

Referring to the accompanying drawings, which form a part of this specification, Figures 1 and 2 are partly-sectional plan and side views of a group of cells supported on special insulating devices according to our invention. Fig. 3 is an end view of same. Figs. 4 to 10 are detail views of special forms of insulators used in supporting and insulating the cells.

The construction of the cells is preferably that shown in our application, Serial No. 35,969, filed November 9, 1900, which is a division of this application.

Each cell $a$ is preferably closed and has a cap $n$ in its top to permit access to its interior, and connections or terminals $g$ are provided for connecting from cell to cell. These connections where they pass from cell to cell are preferably surrounded by washers $p$, of rubber or other elastic insulating material. The cells are arranged in a battery, as shown, and are supported by the means hereinafter described.

To firmly support the cells in proper relative position and at the same time insulate them from one another, we provide supporting and insulating devices, as shown. Referring to Figs. 1 to 3, $r$ represents a tray, frame, or box, wherein the cells are placed and supported. It is desirable to thoroughly insulate the cells from one another, and for this purpose we provide insulators or insulating-supports $s\ t\ u\ v\ w$, adapted to rest on the bottom, in the corners, and on the edges of this tray and to engage with the cell-walls, so as to separate the same from one another and from the tray-walls. The forms of these insulators are shown more clearly in Figs. 4 to 10. They may be made of porcelain or other durable and strong insulating material.

Insulators $s\ t$ (see Figs. 4 and 5) are corner insulators adapted to rest by their portions $x$, respectively, on the top edge and on the bottom of the tray and having flanges or portions $y$, adapted to extend between the tray and the cell-walls to hold and support the latter.

Insulators $u\ v$ (see Figs. 6 and 7) are side insulators adapted to rest by the portions $x$ against the top edge and the bottom of the tray, with their flanges $n$ extending between the cell-walls and the tray. The portions $x$ of insulators $t\ v$ engage under the bottoms of the cells and support the latter vertically. Projecting ribs $z$ on these insulators are adapted to engage between adjacent cells to separate the same.

Insulator $w$ (see Fig. 8) is adapted to rest by its portions $x$ on the bottom of the tray at the corners of the several cells, which rest on such portion $x$, and by its flanges or ribs $y\ z$ to engage between the cell-walls at the corners thereof to separate the same. In order to separate and support the cells at the upper corners, we provide insulators 1, (see Figs. 9 and 10,) these insulators being of porcelain or other insulating material and having portions 2, adapted to rest on the tops of the cells, and ribs 3, adapted to engage between the cell-walls.

By the series of insulators placed as above described we are enabled to support the battery-cells rigidly against displacement laterally in any direction. As the insulators make contact with only a small part of the cell-walls, the surface leakage is reduced to a minimum and any liquid which may be spilled—for example, in filling the cells—does not lodge or rest in between the cells. The box or tray $r$ may be closed, or it may be open at the bottom to permit drainage, if necessary.

The bracing or rigid supporting effect of the insulators is aided by the elastic washers $p$, which support the cells at the ends. To properly support the other or longer sides of the cells, we prefer to provide insulating-rods 4, of glass or other suitable material, which enter between the adjacent cells and hang from top of same by their heads or enlargements 5. These rods are preferably round, so as to present the minimum of surface to the walls of the cells.

It will be noted that all the insulators above described are of durable and heat and acid resisting material and will last practically indefinitely. The insulators 1 4 are readily detachable without moving the cells, and in practice these insulators would be lifted away when the cell-covers are to be removed.

Having thus described our invention, what we claim as new, and desire to secure by Letters Patent, is—

1. The combination with a plurality of cells, and a frame or support, of insulators interposed between the frame and the cells and separating the cells from the frame or support, and from one another.

2. The combination with a plurality of cells and a supporting-frame, of insulators having portions engaging with the frame, portions extending between the frame and the cells and portions extending between the cells.

3. The combination with a plurality of cells and a supporting-frame, of detachable insulators having portions adapted to rest on the top of the cells and portions adapted to extend between the cells.

4. The combination with a plurality of cells placed side by side, of insulators having portions resting on the top of the cells and portions extending down between the cells to hold same apart.

5. The combination with a frame, of a plurality of cells placed on said frame and electrically connected by terminals extending from cell to cell, elastic washers surrounding the terminals between the cells and engaging with the adjacent cells, insulating-supports for the corners of the cells, and insulating-supports between the cells and the supporting-frame.

J. C. CHAMBERLAIN.
HENRY R. SUTPHEN.

Witnesses as to J. C. Chamberlain:
M. V. BIDGOOD,
W. P. HAMMOND.

Witnesses as to Henry R. Sutphen:
JOSEPH J. SCHMIDT,
A. P. KNIGHT.